United States Patent
Ueyama

(10) Patent No.: US 7,440,023 B2
(45) Date of Patent: Oct. 21, 2008

(54) IMAGE PICKUP APPARATUS EQUIPPED WITH LIGHT EMITTING DEVICE AND CONTROL METHOD THEREOF

(75) Inventor: Teruhiko Ueyama, Kawasaki (JP)

(73) Assignee: Canon Kabushiki Kiasha (JP)

( * ) Notice: Subject to any disclaimer, the term of this patent is extended or adjusted under 35 U.S.C. 154(b) by 661 days.

(21) Appl. No.: 11/216,699

(22) Filed: Aug. 31, 2005

(65) Prior Publication Data
US 2006/0062092 A1  Mar. 23, 2006

(30) Foreign Application Priority Data
Aug. 31, 2004  (JP) ............................ 2004-252985

(51) Int. Cl.
  *H04N 5/222* (2006.01)
(52) U.S. Cl. ...................................... 348/371
(58) Field of Classification Search ................ 348/370, 348/371, 372; 320/132, 134, 136, 148, 149, 320/156, 157, 159, 161, 162, 164
See application file for complete search history.

(56) References Cited

U.S. PATENT DOCUMENTS 6,700,610 B1 *  3/2004  Kijima et al. ............... 348/296
6,744,469 B1 *  6/2004  Gudenburr et al. .......... 348/370
7,064,787 B2 *  6/2006  Kijima et al. ............... 348/296
7,298,408 B2 * 11/2007  Yoshida ..................... 348/314

FOREIGN PATENT DOCUMENTS

JP  2002-207236 A  7/2002
JP  2003-114463 A  4/2003

* cited by examiner

*Primary Examiner*—Lin Ye
*Assistant Examiner*—Amy Hsu
(74) *Attorney, Agent, or Firm*—Rossi, Kimms & McDowell, LLP

(57) ABSTRACT

An image pickup apparatus capable of completing photography normally without falling in a low battery (LB) state in the middle of the photography in case of performing the photography with a light emitting device such as an LED emitting light is disclosed. The maximum current value (the maximum light emission amount) of the LED is calculated by the LED maximum current operation unit from the electric power source voltage value obtained by an electric power source control circuit and the data read from a memory. Hereupon, the current operation unit calculates the maximum LED current value at which the electric power source voltage dropping by the light emission of the LED does not become the minimum drive voltage (LB) or less of the image pickup device.

9 Claims, 6 Drawing Sheets

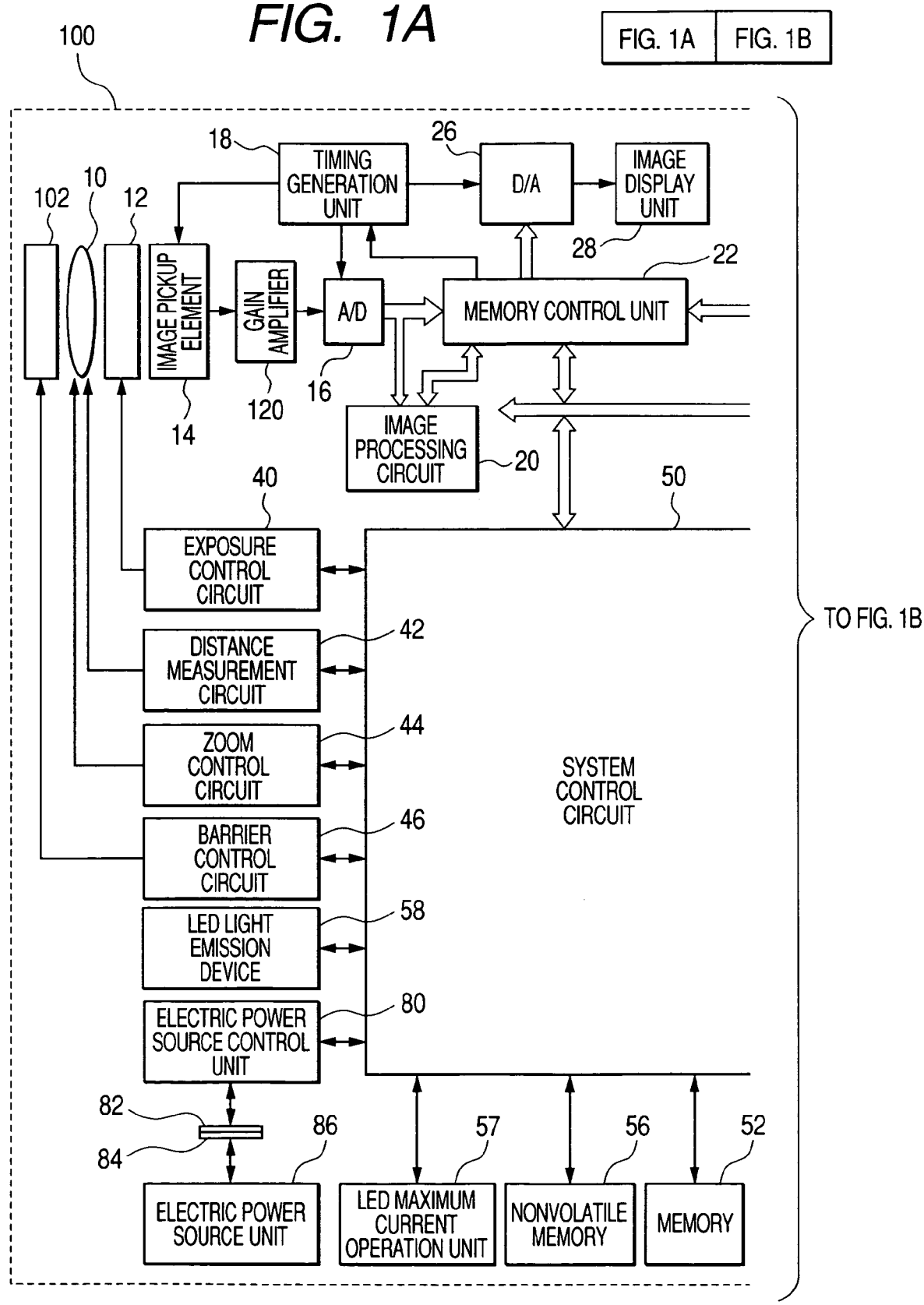

IMAGE PICKUP APPARATUS EQUIPPED WITH LIGHT EMITTING DEVICE AND CONTROL METHOD THEREOF

This application claim priority from Japanese Patent Application No. 2004-252985 filed Aug. 31, 2004, which is hereby incorporated by reference Herein.

BACKGROUND OF THE INVENTION

1. Field of the Invention

The present invention relates to an image pickup apparatus enabling to photograph an object under an appropriate exposure by making a light emitting device such as a light emitting diode (LED) emit light, and the control method of the image pickup apparatus.

2. Description of Related Art

Conventionally, a strobe using a xenon tube has been generally used with an objective of supplementing an insufficient light amount at the time of photographing and providing an illumination effect to a photographing image, in an image processing apparatus such as an electronic camera arranged to record and reproduce still images and moving images using a memory card including a solid-state memory device, as a recording medium.

A strobe is characterized to have a construction of applying high voltage electric power charged in a main capacitor having a large capacity to a xenon tube in response to a trigger signal to make the xenon tube emit light. Consequently, an image pickup apparatus needs a boosting circuit, a trigger device, a main capacitor and the like besides a light emitting unit (the xenon tube), which have been a fetter of the reduction in cost and miniaturization. Moreover, in case of performing. continuous shooting with light being emitted, a time for charging the main capacitor after the light emission is required, and there has been a problem of lengthening a photographing interval.

Consequently, it is a high luminance type light emitting diode (LED) that has been watched in recent years. Because the LED does not need a high voltage and a main capacitor having a large capacity, the number of parts becomes small, and the equipment can be miniaturized at a low cost. Moreover, because no charging time to a capacitor is necessary, the LED scarcely influences the photographing intervals at the time of light emitting. A plurality of image pickup apparatuses using such an LED as a subsidiary light source has been proposed (see, for example, Japanese Patent Application Laid-Open No. 2003-114463 and Japanese Patent Application Laid-Open No. 2002-207236).

However, many image pickup apparatuses each using an LED as a substitute of a strobe severally operate with a battery. Because the LED does not emit light by already charged electric power like a xenon tube when the LED is made to emit light at a high luminance, the current amount of an image pickup apparatus increases during light emitting, and the electric power source voltage drops. At this time, there is a case where the electric power source of the image pickup apparatus falls in a low battery (LB) state, i.e. a sate in which a battery has not a voltage necessary for a normal photographing drive of the image pickup apparatus, during an exposure period or memory access. Consequently, there is a case where photographing cannot be normally completed.

SUMMARY OF THE INVENTION

The present invention was made in view of the problem mentioned above. It is an object of the present invention to provide an image pickup apparatus capable of normal completion of photographing without falling in, a low battery state during photographing in case of performing photographing with light emitting means such as an LED emitting light, the control method thereof, the program thereof, and a recording medium.

An image pickup apparatus as one aspect of the present invention is an image pickup apparatus equipped with one or a plurality of light emitting devices and capable of photographing an object under an appropriate exposure by making one or a plurality of light emitting devices emit light. The image pickup apparatus of the present invention is composed of an electric power source, an electric power source voltage monitoring unit which monitors a voltage value of the electric power source, a light emission amount control unit which controls a light emission amount of light emitting means on the basis of a current value, an electric power source voltage information storage unit which stores data indicating an electric power source voltage dropping characteristic of the image pickup apparatus corresponding to the current value at the time of making the light emitting means emit light, and a maximum current value calculation unit which calculates a maximum current value of the light emitting devices using the voltage value of the electric power source obtained by the electric power source voltage monitoring unit and the data stored in. the electric power source voltage information storage unit.

Moreover, a control method of an image pickup apparatus as another aspect of the present invention is a control method of an image pickup apparatus equipped with one or a plurality of light emitting devices and capable of photographing an object under an appropriate exposure by making one or a plurality of the light emitting devices emit light. The control method of the present invention is composed of an electric power source voltage monitoring step of monitoring an electric power source voltage of the image pickup apparatus, a light emission amount control step of controlling light emission amounts of the light emitting devices on the basis of a current value, a data reading step of reading data from an electric power source voltage information storage unit storing the data indicating an electric power source voltage dropping characteristic of the image pickup apparatus corresponding to the current value at the time of making the light emitting devices emit light, and a maximum current value calculation step of calculating a maximum current value of the light emitting devices from the electric power source voltage obtained in the electric power source voltage monitoring step and the data stored in the electric power source voltage information storage step.

The further objects or features of the present invention are made to be clearer by the preferable embodiments described with reference to the following attached drawings.

DETAILED DESCRIPTION OF THE PREFERRED EMBODIMENTS

Preferred embodiments of the present invention will be described in detail in accordance with the accompanying drawings.

First Embodiment

Schematic Configuration of Image Pickup Apparatus

Figure 1B:
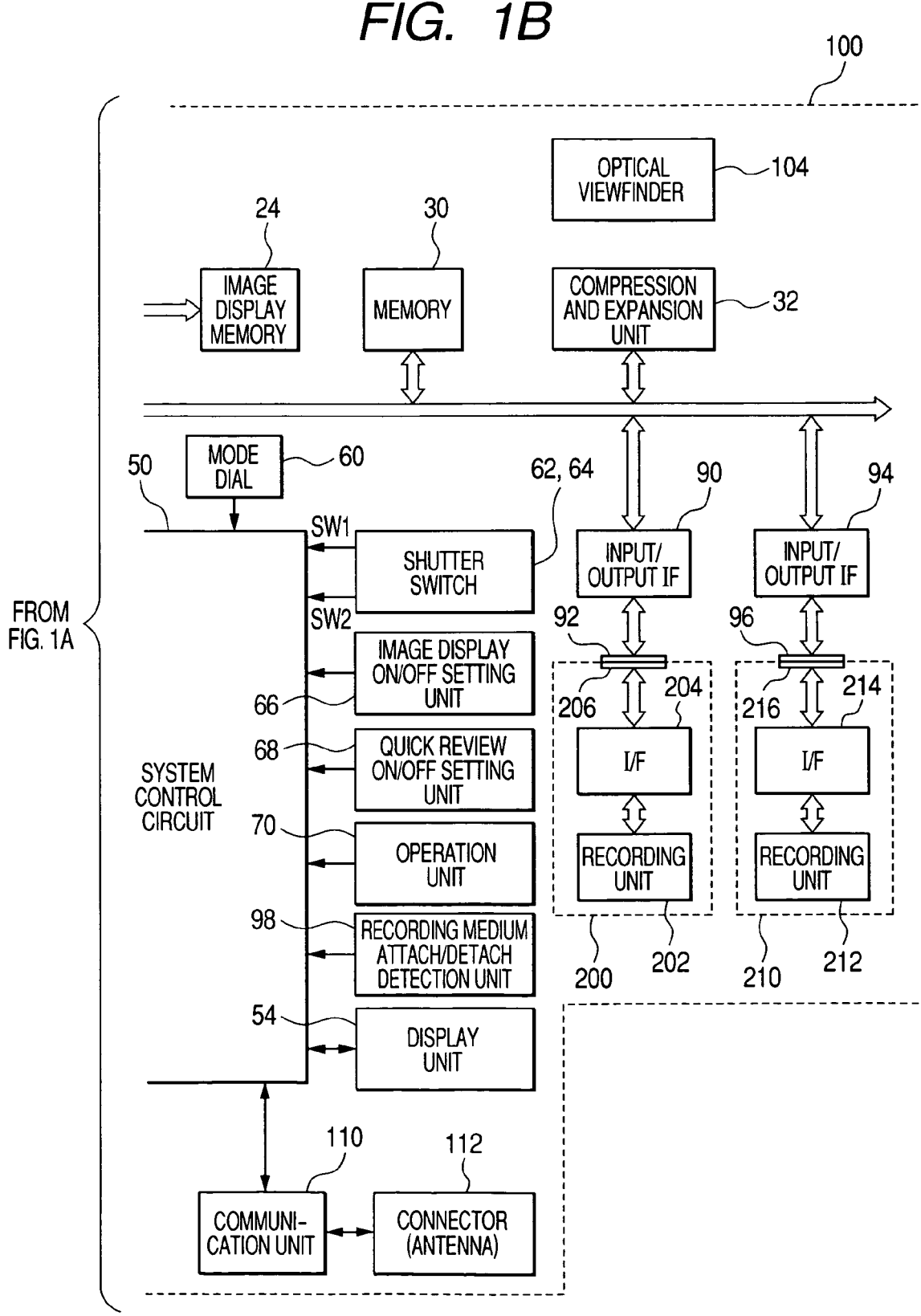
FIG. 1 is comprised of FIGS. 1A and 1B illustrating block diagrams showing the schematic configuration of an image pickup apparatus according to each embodiment of the present invention.

FIGS. 1A and 1B are block diagrams showing the schematic configuration of an image pickup apparatus according to the present embodiment.

In FIGS. 1A and 1B, a reference numeral 100 denotes the image pickup apparatus. A reference numeral 10 denotes an image pickup lens. A reference numeral 12 denotes an iris shutter unit in which an iris and a shutter are incorporated. A reference numeral 14 denotes an image pickup element converting an optical image to an electric signal. A reference numeral 120 denotes a gain amplifier amplifying an analog signal output of the image pickup element 14 to set the sensitivity of a camera. A reference numeral 16 denotes an A/D converter converting the analog signal output of the image pickup element 14 into a digital signal. A reference numeral 18 denotes a timing generation circuit supplying clock signals and control signals to the image pickup element 14, the A/D converter 16, and a D/A converter 26, and the timing generation circuit 18 is controlled by a memory control unit 22 and a system control circuit 50.

A reference numeral 20 denotes an image processing unit, and the image processing unit 20 performs predetermined pixel interpolation processing and color conversion processing to the data from the A/D converter 16 or the data from the memory control unit 22. Moreover, the image processing unit 20 performs predetermined operation processing using picked-up image data. Then, based on an obtained operation result, the system control circuit 50, which will be described later, performs through the lens (TTL) system auto-focus (AF) processing, automatic exposure (AE) processing, and flash pre-firing (EF) processing, which are the control of the system control circuit 50 performed to an exposure control unit 40 and a distance measurement control unit 42. Furthermore, the image processing unit 20 performs predetermined operation processing using the picked-up image data, and TTL system auto-white balance (AWB) processing is also performed based on the acquired operation result.

The reference numeral 22 denotes the memory control unit, and the memory control unit 22 controls the A/D converter 16, the timing generation unit 18, the image processing unit 20, an image display memory 24, the D/A converter 26, a memory 30, and a compression and expansion unit 32. The data of the A/D converter 16 is written in the image display memory 24 or the memory 30 through the image processing unit 20 and the memory control unit 22, or through the memory control unit 22 directly.

The reference numeral 50 denotes the system control circuit controlling the whole image pickup apparatus 100. An exposure operation unit 50a operates an appropriate exposure value based on the luminance level obtained by the photometry by the TTL through the memory control unit 22 to control the exposure control unit 40. An exposure level operation unit 50b operates an exposure level from the image data picked-up through the memory control unit 22. An exposure correction value operation unit 50c compares an exposure (luminance) level obtained by the photometry by the exposure operation unit 50a with an exposure level operated by the exposure level operation unit 50b to operate a correction value (an exposure error correction value for correcting an error of an exposure correction value based on an exposure error value, a set state of the image pickup apparatus, and the like) so as to be an appropriate level. The correction value (a correction error value) is added as a digital gain correction by the image processing unit 20.

The reference numeral 24 denotes the image display memory, and the reference numeral 26 denotes the D/A converter. A reference numeral 28 denotes an image display unit composed of a TFT, an LCD, or the like. The image data for display written in the image display memory 24 is displayed by the image display unit 28 through the D/A converter 26. It is possible to realize an electronic finder function by sequentially displaying picked-up image data using the image display unit 28. Moreover, the image display unit 28 can arbitrarily turn on/off its display in accordance with the instructions from the system control circuit 50. When the image display unit 28 turns off its display, the electric power consumption of the image pickup apparatus 100 can be greatly decreased.

The reference numeral 30 denotes the memory for storing picked-up still images and picked-up moving images, and the memory 30 has a sufficient storage capacity for storing a predetermined number of still images and a predetermined time of moving images. Herewith, it is possible to perform a high speed and mass image writing to the memory 30 even in the case of automatic fire shooting and panoramic shooting, in which a plurality of still images is continuously picked up. Moreover, the memory 30 can be also used as a work area of the system control circuit 50.

The reference numeral 32 denotes the compression and expansion unit performing the compression and the extension of image data by an adaptive discrete cosine transform (ADCT) or the like. The compression and expansion unit 32 reads an image stored in the memory 30 to perform the compression processing thereof or the expansion processing thereof, and to write the processed data into the memory 30.

The reference numeral 40 denotes the exposure control unit controlling the iris shutter unit 12 having an iris function, and the exposure control unit 40 has a function of performing the light modulation of an LED light emission amount by cooperating with an LED light emission device 58, which will be described later. The reference numeral 42 denotes the distance measurement control unit controlling the focusing of the image pickup lens 10. A reference numeral 44 denotes a zoom control unit which controls the zooming of the image pickup lens 10. A reference numeral 46 denotes a barrier control unit controlling the operation of a protection member 102, which is a barrier. The reference numeral 58 denotes the LED light emission device, and the LED light emission device 58 is light emission amount control means for controlling the light emission amount of the LED in accordance with a current value. Moreover, the LED light emission device 58 includes a light projection function of AF subsidiary light and an LED light modulation function as photographing light.

The exposure control unit 40 and the distance measurement control unit 42 are controlled using the TTL system, and the system control circuit 50 controls the exposure control unit 40 and the distance measurement control unit 42 based on an operation result of the picked-up image data operation by the image processing unit 20.

A reference numeral 52 denotes a memory storing constants, variables, programs and the like for the operation of the system control circuit 50. A reference numeral 54 denotes a display unit such as a liquid crystal display and a speaker, displaying operation states, messages and the like using characters, images, sounds and the like according to the execution of a program in the system control circuit 50. The display unit 54 is installed at one or a plurality of positions which is easily sighted and is in the neighborhood of the operation unit of the image pickup apparatus 100. The display unit 54 is composed of, for example, a combination of an LCD, LED's, a sounding device and the like. Moreover, a part of the functions of the display unit 54 is installed in an optical viewfinder 104. A reference numeral 56 denotes an electrically erasable and recordable nonvolatile memory, and for example an EEPROM or the like is used.

The memory 52 or the nonvolatile memory 56 is electric power source voltage information storage means for storing the data indicating the electric power source voltage dropping characteristic of the image pickup apparatus 100 corresponding to a current value at the time of making the LED emit light.

Figure 2:
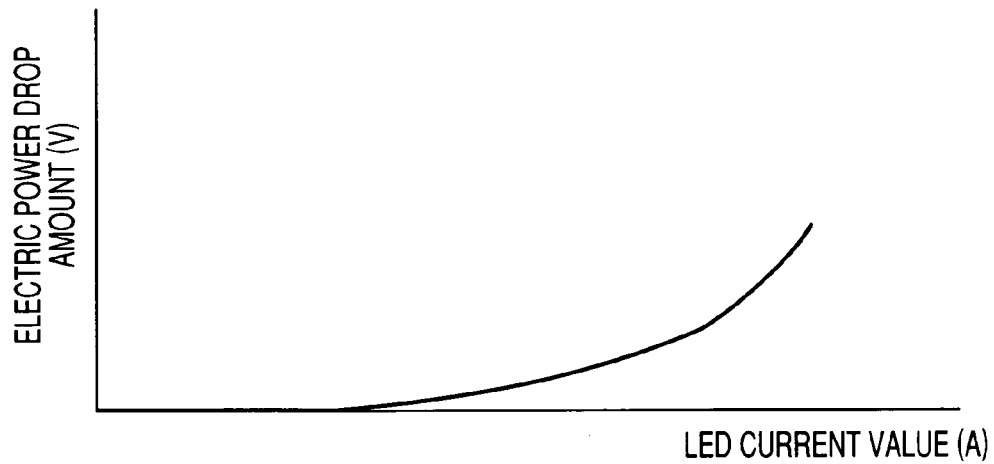
FIG. 2 is a characteristic diagram showing an example of the electric power source voltage dropping characteristic of the image pickup apparatus.
Figure 3:
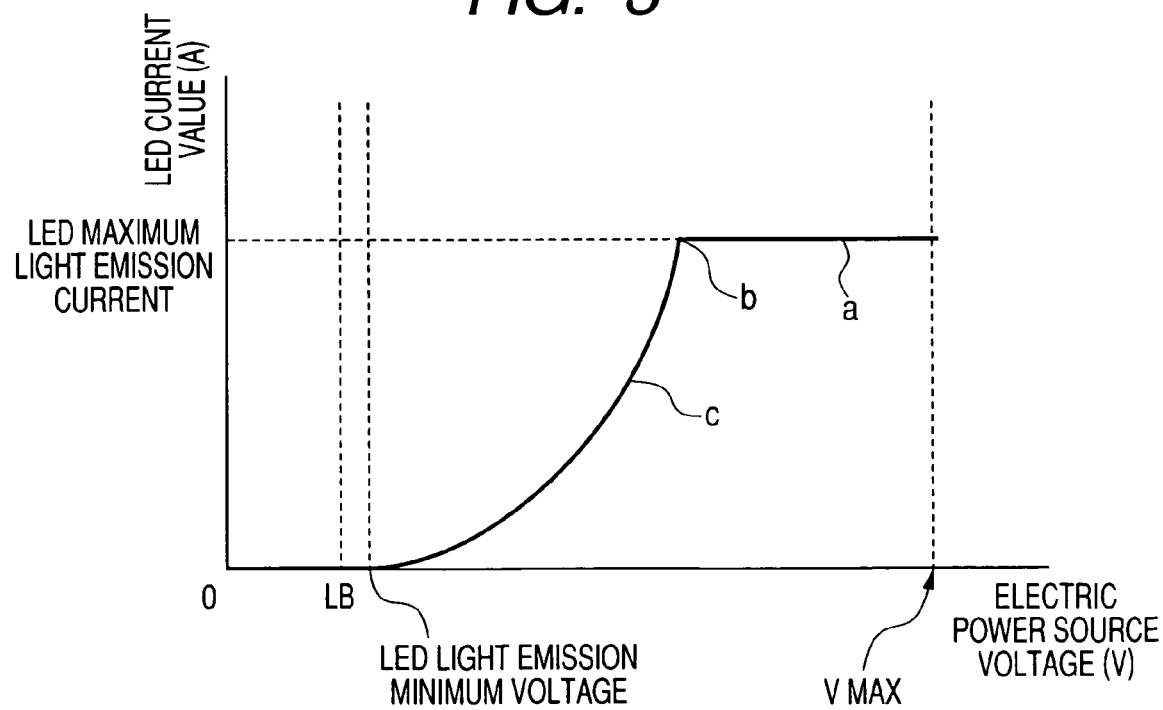
FIG. 3 is a characteristic diagram showing a relation between electric power source voltages at which the image pickup apparatus normally operates and the maximum current values of an LED.

An example of the electric power source voltage dropping characteristic is shown in FIG. 2. Hereupon, the abscissa axis indicates the current value (A) of the LED, and the ordinate axis indicates the voltage drop amount (V) of an electric power source unit 86, respectively. Furthermore, the memory 52 or the nonvolatile memory 56 stores the data indicating a relation between the voltage value of the electric power source unit 86 obtained by an electric power source control unit 80 and the maximum current value of the LED at which the electric power source voltage does not become the minimum drive voltage (LB) or less, namely the image pickup apparatus 100 performs a normal image pickup operation, based on the electric power source voltage dropping characteristic. An example of the data is shown in FIG. 3. Hereupon, the abscissa axis indicates the voltage value (V) of the electric power source unit 86, and the ordinate axis indicates the current value (A) of the LED.

To put it concretely, when a surplus is in the electric power source voltage, the current value allowed for the light emission of the LED is the LED current value at the time of the maximum light emission (a part indicated by a point a in FIG. 3). In this range, even if the LED is made to emit the maximum light emission, the electric power source voltage does not become the LB due to a voltage drop. When the electric power source voltage has become a dropped state, an LED current value with consideration of the electric power source voltage is set as the maximum value permitted to the light emission of the LED current value at a threshoukd b (a part indicated by a point c in FIG. 3). That is, in the part of the point a, although the light emitting is permitted to be performed at the maximum emission amount of the ability owned by the LED device, an upper limit of the current value is limited in the part of the point c. Consequently, the light emitting is only permitted within the limited current value.

Hereupon, the memory 52 or the nonvolatile memory 56 stores the data indicating the electric power source voltage dropping characteristic, the data indicating the relation between the electric power source voltage value and the maximum current value of the LED, and the like as, for example, a data table. In this case, the memory 52 or the nonvolatile memory 56 may be constructed so as to store a functional formula or program software indicating the corresponding contents in place of the data table.

Among the display contents of the display unit 54, the ones to be displayed on the LCD or the like are: a single shoot/continuous shooting image pickup display, a self-timer display, a compressibility display, a recording pixel number display, a recording images display, a number of residual pickable-up images display, a shutter speed display, an iris value display, an exposure correction display, an LED light emission mode display, a red-eye reduction display, a macro image pickup display, a buzzer setting display, a clock battery residual amount display, a battery residual amount display, an error display, an information display by a plurality of digits, an attached-or-detached state display of recording media 200 and 210, a communication I/F operation display, a date/time display, and the like. Moreover, the display contents displayed in the optical viewfinder 104 among the display contents of the display unit 54 are: an in-focus display, a vibration warning display, a strobe charge display, a shutter speed display, an iris value display, an exposure correction display, and the like.

Hereupon, the recording media 200 and 210 may be constructed as composite media each integrating a memory card, a hard disk, and the like as one body. Furthermore, it does not cause any problems even to adopt a configuration in which a part of the composite media can be attached or detached to or from the composite medium. Furthermore, although the recording media 200 and 210 are separated from the image pickup apparatus 100 to be able to be connected with the image pickup apparatus 100 arbitrarily in the example mentioned above, it is a matter of course that there are no problems even if either or all of the recording media are remained to be fixed to the image pickup apparatus 100. Moreover, a configuration in which an arbitrary number, single or plural, of the recording medium 200 or 210 may be adapted so as to be capable of being connected to the image pickup apparatus 100. Moreover, although the configuration has been described as one in which the recording media 200 and 210 are installed into the image pickup apparatus 100, a configuration composed of either of single and a plurality of recording media may be adopted.

Reference numerals 62, 64, 66, 68, and 70 denote operating members for inputting various operating instructions of the system control circuit 50, and the operating members 62, 64, 66, 68, and 70 are composed of a single or a plurality of combinations of a switch, a dial, a touch panel, pointing by sight line detection, a voice recognition apparatus, and the like. Here, concrete descriptions of the operating members are given.

The reference numeral 62 denotes a shutter switch SW1. The shutter switch SW1 turns on in the middle of an operation of a not shown shutter switch member, and instructs the start of an image pickup preparation operation of auto-focus (AF) processing, automatic exposure (AE) processing, auto-white balance (AWB) processing, strobe (a xenon tube or an LED) pre-firing (EF) processing, and the like. The reference numeral 64 denotes a shutter switch SW2. The shutter switch SW2 turns on by the completion of the operation of the not shown shutter switch member, and instructs the start of an image pickup operation of a series of processing composed of the exposure processing of writing a signal read out from the image pickup element 14 into the memory 30 as image data through the A/D converter 16 and the memory control unit 22, the developing procedure using the operations in the image processing unit 20 and the memory control unit 22, and the recording processing of reading image data from the memory 30, performing the compression of the data with the compression and expansion unit 32, and writing the compressed data into the recording medium 200 or 210.

The reference numeral 66 denotes an image display on/off setting unit, and the image display on/off setting unit 66 can set the on/off of the image display unit 28. It is possible to design electric power saving by intercepting the current supply to the image display unit 28 composed of a TFT, an LCD, or the like by means of the function at the time of performing an image pickup using the optical viewfinder 104. The reference numeral 68 denotes a quick review on/off setting unit, and the quick review on/off setting unit 68 sets a quick review function of reproducing the picked-up image data automatically immediately after the image pickup. Incidentally, it is supposed that each embodiment of the present invention is equipped with the function of setting the quick review function in the case of making the image display unit 28 off.

The reference numeral 70 denotes an operation unit composed of various buttons, a touch panel, and the like. The operation unit 70 includes a menu button, a setting button, a macro button, a multi-screen reproduction page break button, a strobe setting button, a single shoot/continuous shoot/self-timer switching button, a menu movement + (plus) button, a menu movement − (minus) button, a reproduction image movement + (plus) button, a reproduction image movement − (minus) button, an image pickup quality selection button, an exposure correction button, a date/time setting button, and the like.

The reference numeral 80 denotes the electric power source control unit, and the electric power source control unit 80 is composed of a battery detection circuit, a DC-DC converter, a switching circuit switching the block to be energized, and the like. The electric power source control unit 80 performs the detection (monitoring) of the existence of the mounting of a battery, the kind of the battery, the residual amount of the battery, and an electric power source voltage (electric power source voltage monitoring means), and controls the DC-DC converter based on the detection result and the instruction of the system control circuit 50 to supply a required voltage to each unit including the recording media for a required period.

A reference numeral 57 denotes an LED maximum current operation unit. The LED maximum current operation unit 57 is maximum current value calculation means for reading the data for calculating the maximum current value of the LED stored in the memory 52 or the nonvolatile memory 56 based on the voltage value of the electric power source unit 86 obtained by the electric power source control unit 80, and for calculating the maximum light emission amount of the LED.

A reference numeral 82 denotes a connector. A reference numeral 84 denotes a connector. The reference numeral 86 denotes the electric power source unit composed of a primary battery such as an alkaline battery and a lithium battery, a secondary battery such as a NiCd battery, a NiMH battery, and a Li battery, an AC adaptor, and the like.

Reference numerals 90 and 94 denote interfaces for recording media such as a memory card and a hard disk. Reference numerals 92 and 96 denote connectors performing the connection with the recording media such as the memory card and the hard disk. A reference numeral 98 denotes a recording medium attach/detach detection unit detecting whether the recording medium 200 or 210 is connected to the connector 92 and/or 96 or not.

Incidentally, in the present embodiment, descriptions are given on the supposition that two systems of the interfaces and the connectors are provided. It is a matter of course that the interface and the connector to which the recording medium is attached may be constructed to be provided with either of a single or a plurality of system numbers. Moreover, a configuration of a combination of interfaces and connectors in accordance with different standards may be adopted. The interfaces and the connectors may be constructed using ones in conformity with the standards of a PCMCIA card, a CF card, or the like.

Moreover, when the interfaces 90 and 94 and the connectors 92 and 96 are composed by using the ones based on the standards of the PCMCIA card, the CF card, and the like, image data and management information attached to the image data can be mutually transferred with another computer and peripheral equipment such as a printer by connecting various communication cards such as a LAN card, a modem card, a USB card, an IEEE 1394 card, a P 1284 card, a SCSI card, and a communication card such as a PHS.

The reference numeral 102 denotes the protection member being a barrier preventing the image pickup portion from contamination and breakage by covering the image pickup portion including the lens 10 of the image pickup apparatus 100. The reference numeral 104 denotes the optical viewfinder. It is possible to perform image pickup using only the optical viewfinder 104 without using the electronic finder function by the image display unit 28. Moreover, in the optical viewfinder 104, a part of the functions of the display unit 54 such as the in-focus display, the vibration warning display, the strobe charge display, the shutter speed display, the iris value display, and the exposure correction display is installed.

A reference numeral 110 denotes a communication unit. The communication unit 110 has various communication functions such as RS 232C, USB, IEEE 1394, P 1284 and SCSI, a modem, a LAN, and a radio communication. A reference numeral 112 denotes a connector connecting the image pickup apparatus 100 to another apparatus through the communication unit 110, or an antenna in the case of the radio communication.

The reference numeral 200 denotes the recording medium such as the memory card and the hard disk. The recording medium 200 is equipped with a recording unit 202 composed of a semiconductor memory, a magnetic disk, or the like, an interface 204 with the image pickup apparatus 100, and a connector 206 performing the connection with the image pickup apparatus 100. The reference numeral 210 denotes the recording medium such as the memory card and the hard disk. The recording medium 210 is equipped with a recording unit 212 composed of the semiconductor memory, the magnetic disk or the like, an interface 214 for the image pickup apparatus 100, and a connector 216 performing the connection with the image pickup apparatus 100.

Control Method of Image Pickup Apparatus

Figure 4:
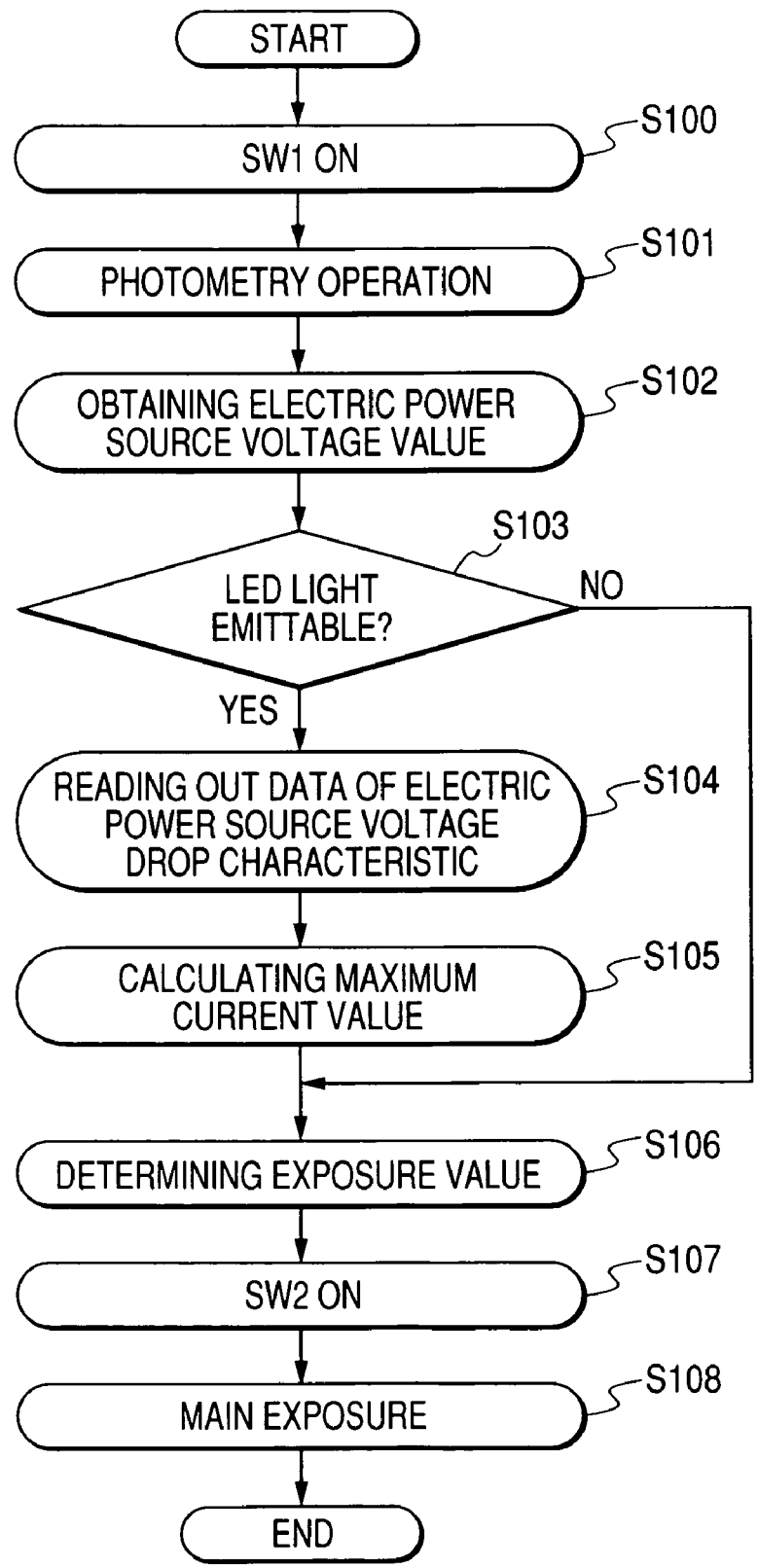
FIG. 4 is a flowchart showing the main routine of a control method of an image pickup apparatus 100 according to a first embodiment.

FIG. 4 is a flowchart showing the main routine of the control method of the image pickup apparatus 100 according to the present embodiment. In the following, the control operation of the image pickup apparatus 100 is described in conformity with FIGS. 1A, 1B and 4.

First, when the shutter switch SW1 is pushed down, photography preparation is started (Step S100), and photometry operation processing is performed (Step S101). Successively, an electric power source voltage value is obtained in the electric power source control unit 80 (Step S102), and it is judged whether the LED is made to emit light or not based on the photometry value obtained by the photometry operation processing (Step S103).

When the light emission judgment result at Step S103 is yes (light emission is performed), the data indicating the current value at the time of the LED light emission and the electric power source voltage dropping characteristic (see, for example, FIG. 2) is read out from the memory 52 or the nonvolatile memory 56 (Step S104).

Successively, the maximum current value (the maximum light emission amount) of the LED is calculated by the LED maximum current operation unit 57 from the electric power source voltage value obtained by the electric power source control unit 80 at Step S102 and the data read out from the memory 52 or the nonvolatile memory 56 (Step S105). At Step S105, the maximum LED current value at which the electric power source voltage which drops by the light emission of the LED does not become the minimum drive voltage (LB) or less of the image pickup apparatus 100 is calculated.

Successively, at Step S106, photography conditions such as the light emission amount (current value) of the LED, an iris value, a shutter speed, and the sensitivity under which the current value becomes the maximum current value of the LED or less calculated at Step S105 is determined based on the photometry result at Step S101. When the shutter switch SW2 is pushed down (Step S107), the photographing (main exposure) is performed (Step S108).

When it is judged to be no (light emission is not performed) at Step S103, the photography conditions when the LED is not made to emit light is determined at Step S106. When the shutter switch SW2 is pushed (Step S107), photography (main exposure) is performed (Step S108).

Incidentally, although the LED has been exemplified as the light emitting means of the subsidiary light in the present embodiment, the present invention is not limited to the LED. For example, semiconductor light emitting device or an electric lamp having similar characteristics may be used.

As described above, according to the present embodiment, an image pickup apparatus and the control method thereof capable of completing the normal photography without causing a low battery state in the middle of the photography when the photography is performed by making the light emitting means such as the LED emit light can be realized.

Second Embodiment

Although the image pickup apparatus of the present embodiment takes the same apparatus configuration as that of the first embodiment, it is different from the first embodiment in that the control method thereof is different from that of the first embodiment a little.

Figure 5:
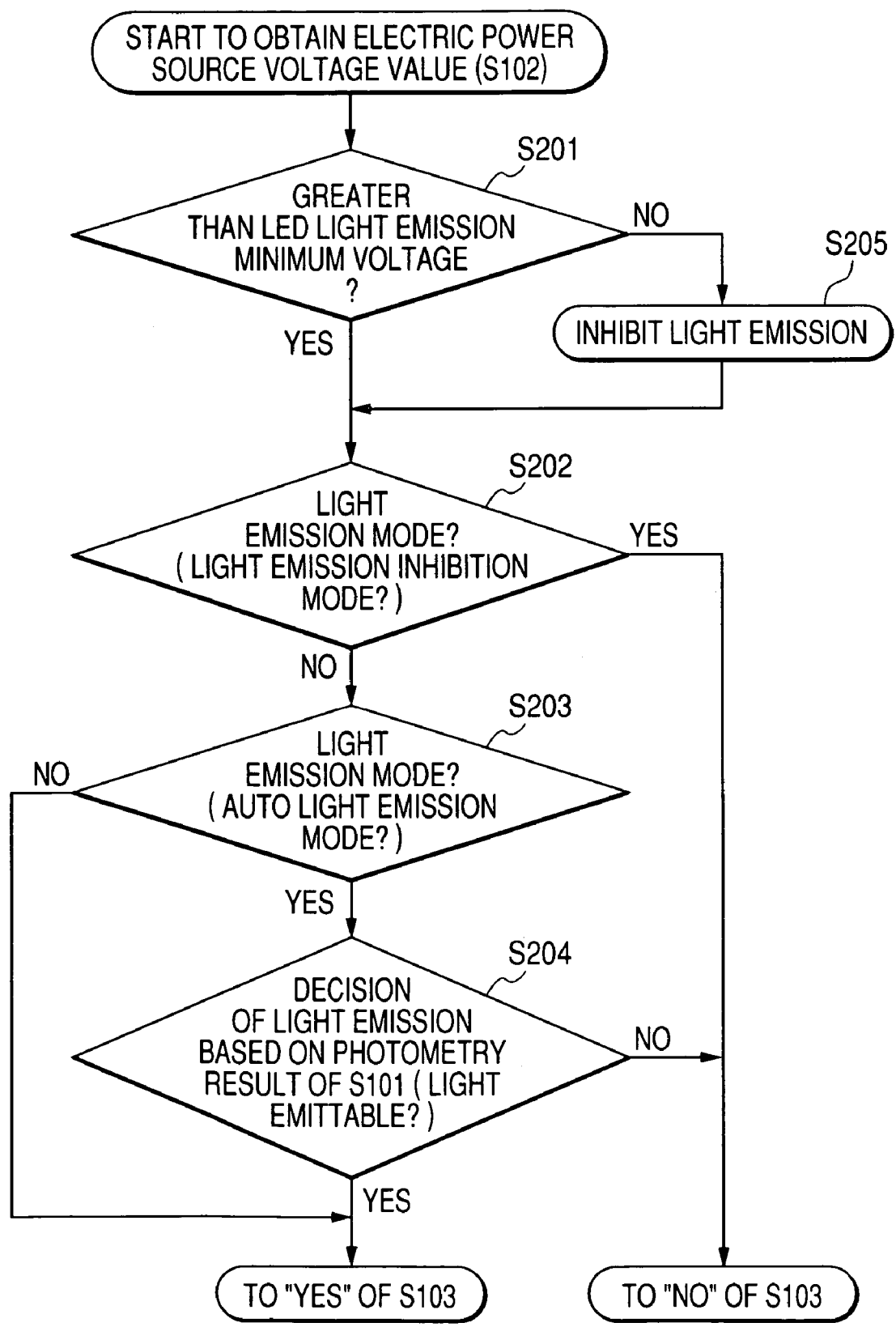
FIG. 5 is a flowchart showing the main routine of the control method of the image pickup apparatus 100 according to a second embodiment.

FIG. 5 is a flowchart showing the control method according to the present embodiment as one produced by extracting the different parts from that of FIG. 4. In the following, the control operation of the image pickup apparatus 100 is described with reference to FIGS. 4 and 5.

Although whether the LED is made to emit light or not is judged based on the photometry value obtained by the photometry operation processing (Step S101 in FIG. 4) as the contents of the propriety judgment of the LED light emission (Step S103 in FIG. 4) in the first embodiment, the propriety of the light emission may be judged as follows.

First, Step S102 of FIG. 4 is executed, and whether the electric power source voltage value obtained here is the minimum voltage of the LED light emission or more or not is judged (Step S201).

When the electric power source voltage value is smaller than the minimum value of the LED light emission (no at Step S201), the image pickup apparatus 100 is set in the light emission inhibition mode (Step S205), and the processing proceeds to Step S202. On the other hand, when the electric power source voltage value is the minimum voltage of the LED light emission or more (yes at Step S201), the processing proceeds to Step S202 as it is.

The set light emission mode is judged at Step S202. Here, when the mode is set as the light emission inhibition mode, the processing proceeds to yes at Step S202, and reaches the processing of no at Step S103 of FIG. 4. When the mode is not set as the light emission inhibition mode, the processing proceeds to no at Step S202.

Successively, at Step S203, it is judged whether the light emission mode is an auto light emission mode or not. When the light emission mode is the auto light emission mode (yes at Step S203), it is judged whether light emission is performed or not, based on the photometry result at Step S101 of FIG. 4. When it is decided to perform the light emission (yes at Step S204), the processing proceeds to yes at Step S103 of FIG. 4. When it is decided not to perform the light emission (no at Step S204), the processing proceeds to no at Step S103 of FIG. 4. When the light emission mode is one other than the auto light emission mode (for example, a forced light emission mode), the processing proceeds to yes at Step S103 of FIG. 4. By the steps mentioned above, the propriety of the light emission of the LED is determined.

After that, when the processing has proceeded to yes at Step S103, the processing of Steps S104 to S108 of FIG. 4 is executed, and the processing is ended. On the other hand, when the processing has proceeded to no at Step S103 of FIG. 4, the processing of Steps S106 to S108 of FIG. 4 is executed, and the processing is ended.

As described above, according to the present embodiment, the image pickup apparatus and the control method thereof which can complete the normal photography without falling in the low battery state in the middle of the photography when the photography is performed with the light emitting means such as the LED emitting light can be realized. Moreover, the propriety of the light emission of the LED can be surely performed.

MODIFIED EXAMPLE

Although the voltage drop characteristic at the time of making the LED emit light is a characteristic corresponding to the current value of the LED in the first and the second embodiments, the voltage drop characteristic may be made to one having the consideration of the current value and the light emitting time of the LED.

Figure 6:
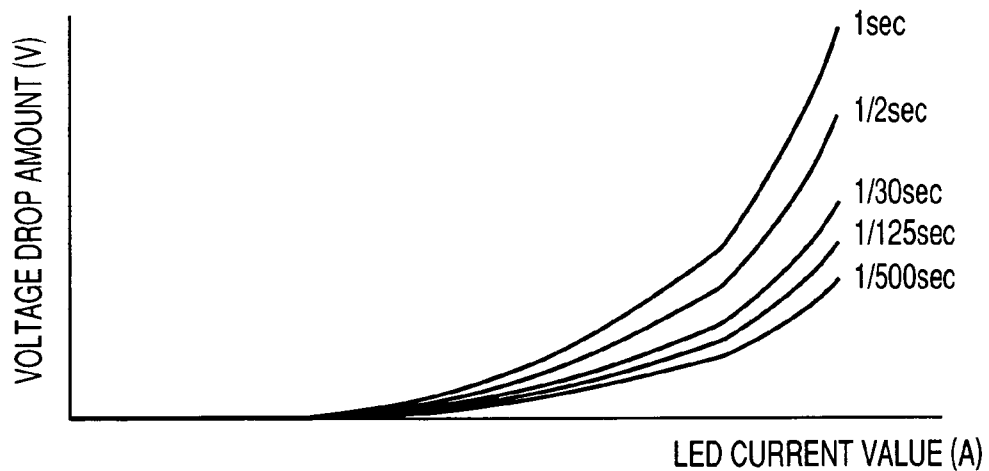
FIG. 6 is a characteristic diagram showing an example of the electric power source voltage dropping characteristic of an image pickup apparatus.
Figure 7:
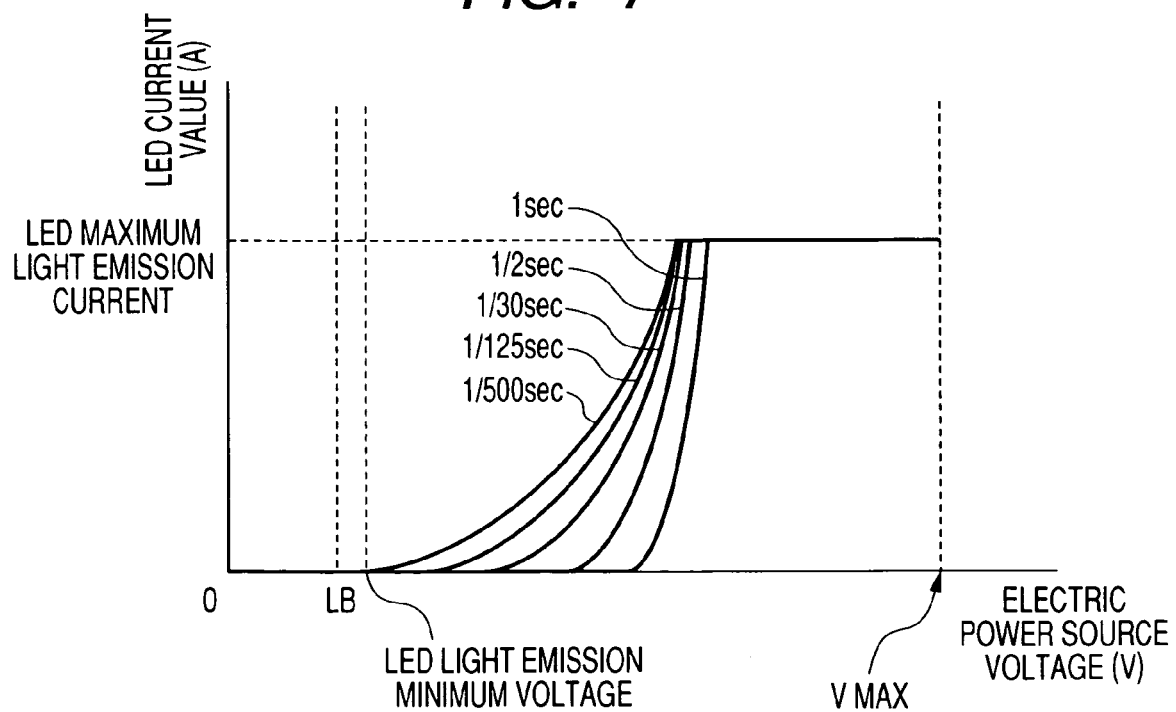
FIG. 7 is a characteristic diagram showing relations between electric power source voltages at which the image pickup apparatus operates normally and the maximum current value of an LED.

An example of the electric power source voltage dropping characteristic is shown in FIG. 6. Here, the abscissa axis indicates the current value (A) of the LED, and the ordinate axis indicates the voltage drop amount (V) of the electric power source unit 86, respectively. Electric power source voltage dropping characteristics when the light emission time is changed from 1/500 sec. to 1 sec. are shown. The memory 52 or the nonvolatile memory 56 stores the data indicating the relation between the voltage values of the electric power source 86 obtained by the electric power source control unit 80 based on the electric power source voltage dropping characteristic and the maximum current values of the LED at which the electric power source voltage of the image pickup apparatus 100 does not become the minimum drive voltage (LB) or less, namely the maximum current values of the LED at which the image pickup apparatus 100 performs the normal operation thereof. An example of the data is shown in FIG. 7. Here, the abscissa axis thereof indicates the voltage value (V) of the electric power source unit 86, and the ordinate axis thereof indicates the current value (A) of the LED. By considering the light emission time in addition to the current value of the LED, it is known that the data having higher accuracy and correctness can be obtained in a conscientious and elaborate manner.

Other Embodiments

Similar advantages can be obtained by supplying a computer-readable recording medium recording the program codes of the software realizing the functions of the image pickup apparatuses of the first and the second embodiments and the modified example mentioned above and the program codes for making a computer execute the control methods of the image pickup apparatuses (e.g. Steps S100 to S108 of FIG. 4 and Steps S201 to S205 of FIG. 5) to a system or an apparatus, and by the reading and the execution of the program codes stored in the recording medium by the computer (the CPU or the MPU) of the system or the apparatus.

In this case, the program codes read from the recording medium themselves realize the functions of each of the embodiment mentioned above, and the program codes constitutes the present invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the system or apparatus, the present invention includes a case where an OS (operating system) or the like working on the computer performs a part or entire processes in accordance with designations of the program codes and realizes functions according to the above embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-252985 filed Aug. 31, 2004, which is hereby incorporated by reference herein.

What is claimed is:

1. An image pickup apparatus equipped with one or a plurality of light emitting devices and capable of photographing an object under an appropriate exposure by making one or a plurality of said light emitting devices emit light, said apparatus comprising:
    an electric power source;
    an electric power source voltage monitoring unit which monitors a voltage value of said electric power source;
    a light emission amount control unit which controls a light emission amount of light emitting means on the basis of a current value;
    an electric power source voltage information storage unit which stores data indicating an electric power source voltage dropping characteristic of said image pickup apparatus corresponding to the current value at the time of making said light emitting means emit light; and
    a maximum current value calculation unit which calculates a maximum current value of said light emitting devices using the voltage value of said electric power source obtained by said electric power source voltage monitoring unit and the data stored in said electric power source voltage information storage unit.

2. An image pickup apparatus according to claim 1, wherein said electric power source voltage information storage unit stores data indicating the electric power source voltage dropping characteristic of said image pickup apparatus corresponding to the current value at the time of making the light emitting devices emit light and a light emitting time.

3. An image pickup apparatus according to claim 1, wherein said electric power source voltage information storage unit includes data indicating a relation between a voltage value of said electric power source expected to be obtained by said electric power source voltage monitoring unit based on the electric power source voltage dropping characteristic and a maximum current value of said light emitting devices by which said image pickup apparatus can perform normal pickup operation.

4. An image pickup apparatus according to claim 1, wherein said light emitting devices are light emitting diodes.

5. A control method of an image pickup apparatus equipped with one or a plurality of light emitting devices and capable of photographing an object under an appropriate exposure by making one or a plurality of said light emitting devices emit light, said method comprising:
    an electric power source voltage monitoring step of monitoring an electric power source voltage of said image pickup apparatus;
    a light emission amount control step of controlling light emission amounts of said light emitting devices on the basis of a current value;
    a data reading step of reading data from an electric power source voltage information storage unit storing the data indicating an electric power source voltage dropping characteristic of said image pickup apparatus corresponding to the current value at the time of making said light emitting devices emit light; and
    a maximum current value calculation step of calculating a maximum current value of said light emitting devices from the electric power source voltage obtained in said electric power source voltage monitoring step and the data stored in said electric power source voltage information storage step.

6. A control method of an image pickup apparatus according to claim 5, wherein said electric power source voltage information storage unit stores data indicating the electric power source voltage dropping characteristic of said image pickup apparatus corresponding to the current value at the time of making the light emitting devices emit light and a light emitting time.

7. A control method of an image pickup apparatus according to claim 5, wherein said electric power source voltage information storage unit includes data indicating a relation between a voltage value of said electric power source expected to be obtained by said electric power source voltage monitoring step based on the electric power source voltage dropping characteristic and a maximum current value of said light emitting devices by which said image pickup apparatus can perform normal pickup operation.

8. A control method of an image pickup apparatus according to claim 5, wherein said light emitting devices are light emitting diodes.

9. A computer readable medium storing a computer program for making a computer execute said control method of an image pickup apparatus according to claim 5.

* * * * *

UNITED STATES PATENT AND TRADEMARK OFFICE
CERTIFICATE OF CORRECTION

PATENT NO. : 7,440,023 B2
APPLICATION NO. : 11/216699
DATED : October 21, 2008
INVENTOR(S) : Teruhiko Ueyama It is certified that error appears in the above-identified patent and that said Letters Patent is hereby corrected as shown below:

Title Page

In the Secton (73), Titled "Assignee" amend last name as follows:

FROM: -- KIASHA --

TO READ: -- KAISHA --

Signed and Sealed this

Second Day of December, 2008

JON W. DUDAS
*Director of the United States Patent and Trademark Office*